United States Patent
Qi et al.

(10) Patent No.: US 11,429,596 B2
(45) Date of Patent: Aug. 30, 2022

(54) UPDATE FOR CONFIGURATION FILE

(71) Applicant: INTERNATIONAL BUSINESS MACHINES CORPORATION, Armonk, NY (US)

(72) Inventors: Yong Xin Qi, Beijing (CN); Na Tian, Beijing (CN); Bang Ling Gu, Dezhou (CN); Tie Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/853,077

(22) Filed: Apr. 20, 2020

(65) Prior Publication Data
US 2021/0326333 A1    Oct. 21, 2021

(51) Int. Cl.
G06F 7/00        (2006.01)
G06F 17/00       (2019.01)
G06F 16/23       (2019.01)

(52) U.S. Cl.
CPC ...... *G06F 16/2379* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 9,342,273 B1* | 5/2016 | Kumar | G06F 8/74 |
| 10,169,347 B2 | 1/2019 | Jayachandran et al. | |
| 2017/0177860 A1* | 6/2017 | Suarez | G06F 9/45558 |
| 2018/0160156 A1* | 6/2018 | Hannuksela | H04N 21/234327 |

(Continued)

FOREIGN PATENT DOCUMENTS

| | | |
|---|---|---|
| CN | 106227579 A | 12/2016 |
| CN | 107491329 A | 12/2017 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Tuan A Pham
(74) *Attorney, Agent, or Firm* — Teddi E. Maranzano

(57) ABSTRACT

Embodiments of the present disclosure relate to update for a configuration file. In an embodiment, a computer-implemented method is disclosed. According to the method, a first container image and a second container image are obtained. The first container image comprise a first sequence of layers built based on a sequence of commands in a configuration file, respectively, and the second container image comprise a second sequence of layers built based on the sequence of commands, respectively. File dependency between at least two commands of the sequence of commands is determined by comparing files associated with the first sequence of layers with files associated with the second sequence of layers. An update to the sequence of commands in the configuration file is determined based on the file dependency. In other embodiments, a system and a computer program product are disclosed.

17 Claims, 10 Drawing Sheets

910

| CHANGES IN | server.js | package.json |
|---|---|---|
| LAYER CACHE MISS START AT | Layer2 | Layer2 |
| AMOUNT OF FILE CHANGES AT EACH LEVEL | Layer2: 1<br>Layer3: 0 | Layer2: 1<br>Layer3: 32 |
| FILE DEPENDENCY BETWEEN COMMANDS | No dependency | High dependency |
| DETAIL | Files associated with layer after Layer2 has no dependency with server.js at Layer2 | Files associated with layer after Layer 2 has high dependency with package.json |

(56) References Cited

U.S. PATENT DOCUMENTS

2019/0108048 A1* 4/2019 Chen ...................... G06F 9/455
2020/0097662 A1* 3/2020 Hufsmith .............. H04L 9/0643

FOREIGN PATENT DOCUMENTS

CN  108415795 a   8/2018
WO  2019056931 A1 3/2019

OTHER PUBLICATIONS

Cito et al., "An Empirical Analysis of the Docker Container Ecosystem on GitHub", PeerJ Preprints, Published Apr. 3, 2017, 11 pages.
Disclosed Anonymously, "An innovative way to build and save Docker image", An IP.com Prior Art Database Technical Disclosure, IP.com No. IPCOM000257722D, IP.com Electronic Publication Date: Mar. 6, 2019, 6 pages.

\* cited by examiner

INFORMATION ON COMMANDS IN CONFIGURATION FILE 430

730 ⤴

| LINE | COMMAND | ARGS |
|---|---|---|
| 3 | RUN | cd /src && npm install |
| 2 | COPY | ./src |
| 1 | FROM | node |

INFORMATION ON LAYERS OF CONTAINER IMAGE 450-1

750-1 ⤴

| LAYER NO. | LAYER ID | CREATED BY |
|---|---|---|
| 3 | c92f60105ec9 | /bin/sh -c cd /src && npm install |
| 2 | c22e63230f3c | /bin/sh -c #(nop) COPY dir:973f3418bdb554f61... |
| 1 | 7c412a558705 | /bin/sh -c #(nop) CMD ["node"] |

INFORMATION ON LAYERS OF CONTAINER IMAGE 450-2

750-2 ⤴

| LAYER NO. | LAYER ID | CREATED BY |
|---|---|---|
| 3 | a9d6fa3dee6f | /bin/sh -c cd /src && npm install |
| 2 | cc7658e515c4 | /bin/sh -c #(nop) COPY dir:b5fa07a2a2bb0bba1... |
| 1 | 7c412a558705 | /bin/sh -c #(nop) CMD ["node"] |

FIG. 7

UPDATE FOR CONFIGURATION FILE

BACKGROUND

The present invention relates to computer techniques, and more specifically, to a method, system, and computer program product for determining an update for a configuration file used in building container images.

Generally, containers can be described as virtual environments providing portability to a set of encapsulated applications. Such container-based environments may help simplify environment standardization, enabling instant deployment of applications. An example container-based environment may include Docker®. Each container may be run based on a container image with a stack of layers. The container image may be built based on a corresponding configuration file (for example, Dockerfile in Docker). The layers in the container image may be generated when a sequence of commands in the corresponding configuration file are executed during the image building process. Layers of the built container image may be cached and reused in some cases where a new container image is to be built based on the same configuration file.

SUMMARY

An embodiment of the present invention provides a computer-implemented method. According to the method, a first container image and a second container image are obtained. The first container image comprise a first sequence of layers built based on a sequence of commands in a configuration file, respectively, and the second container image comprise a second sequence of layers built based on the sequence of commands, respectively. File dependency between at least two commands of the sequence of commands is determined by comparing files associated with the first sequence of layers with files associated with the second sequence of layers. An update to the sequence of commands in the configuration file is determined based on the file dependency.

Another embodiment of the present invention provides a system. The system comprises a processing unit; and a memory coupled to the processing unit and storing instructions thereon. The instructions, when executed by the processing unit, perform acts of the method according to the above embodiment.

Another embodiment of the present invention provides a computer program product. The computer program product comprises a computer readable storage medium having program instructions embodied therewith, the program instructions executable by an electronic device to cause the electronic device to perform acts of the method according to the above embodiment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 7 depicts some examples of information on first and second container images and information on the configuration file according to some embodiments of the present invention.

DETAILED DESCRIPTION

Figure 1:
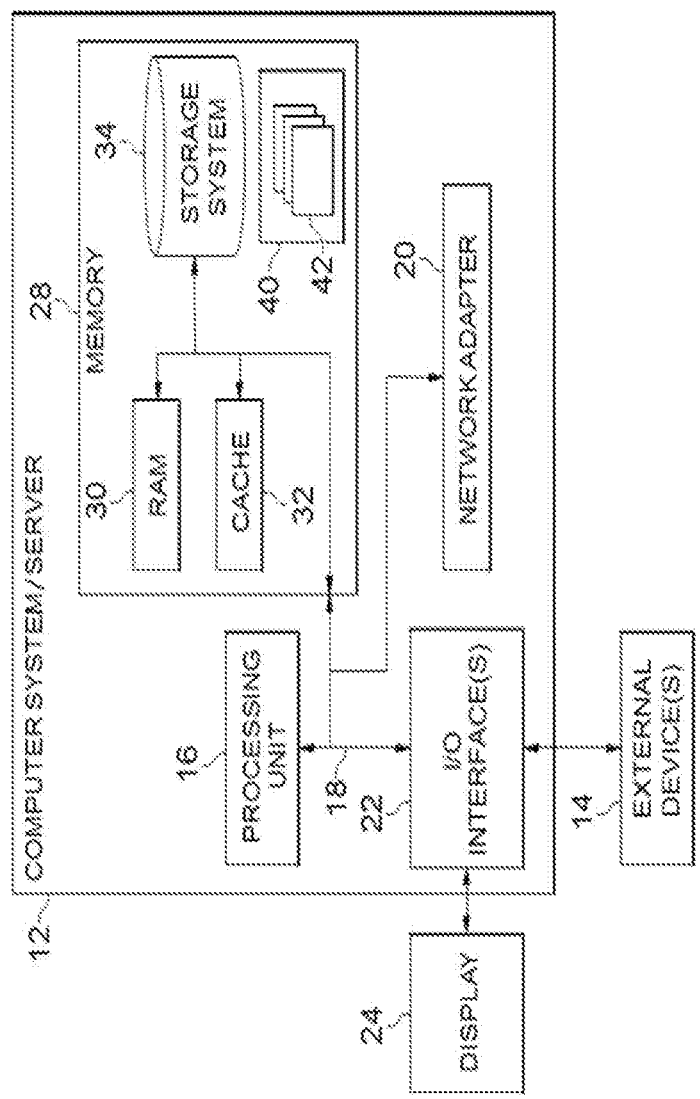
FIG. 1 depicts a cloud computing node according to some embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
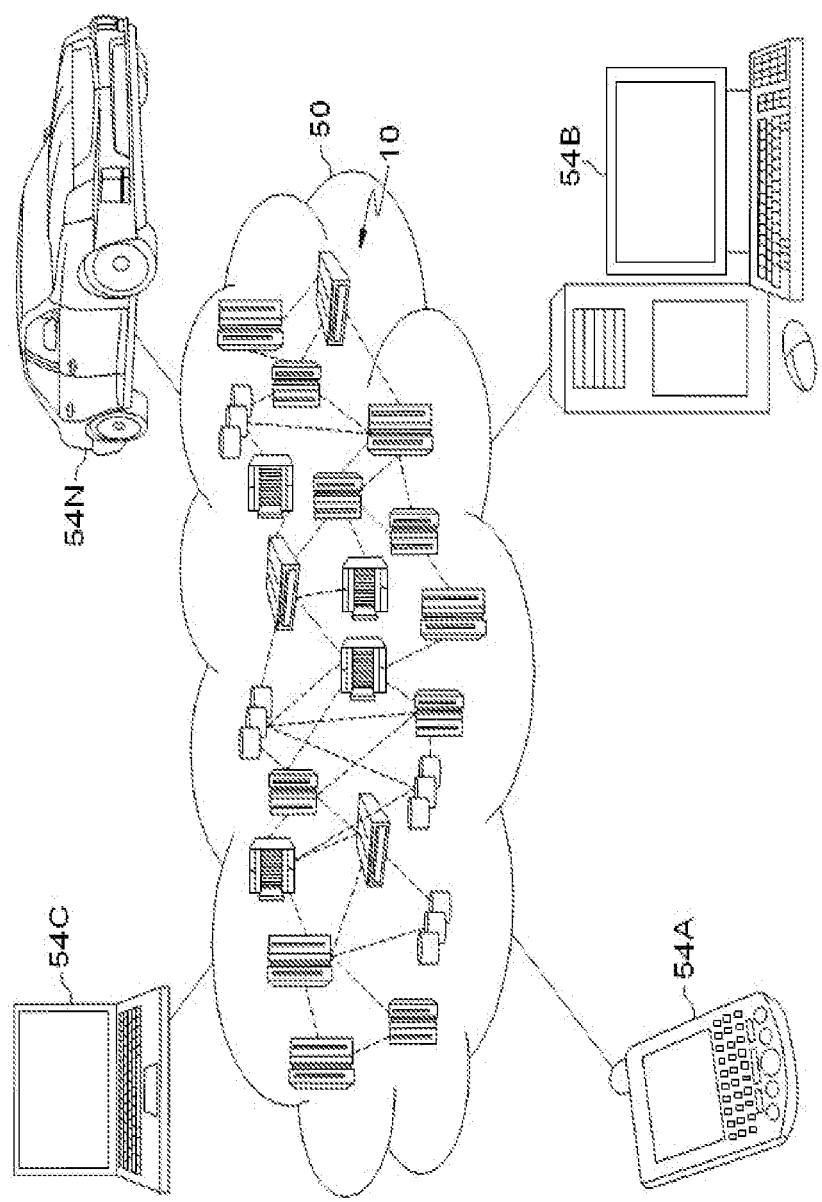
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
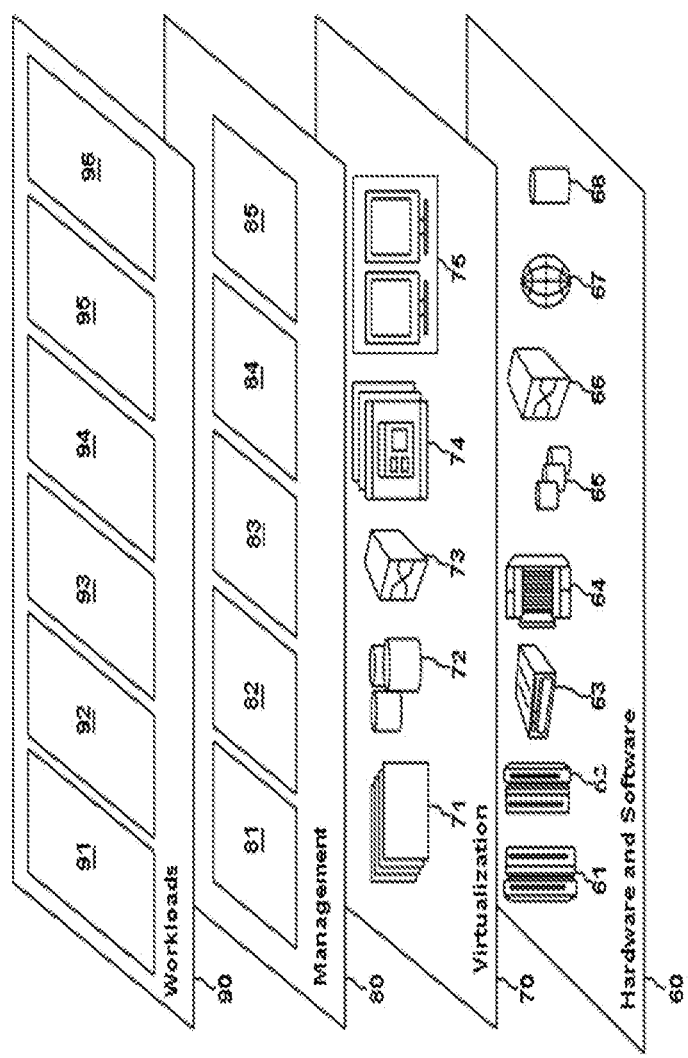
FIG. 3 depicts abstraction model layers according to some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and configuration file update 96. The functionalities of configuration file update will be described in the following embodiments of the present disclosure.

Figure 4:
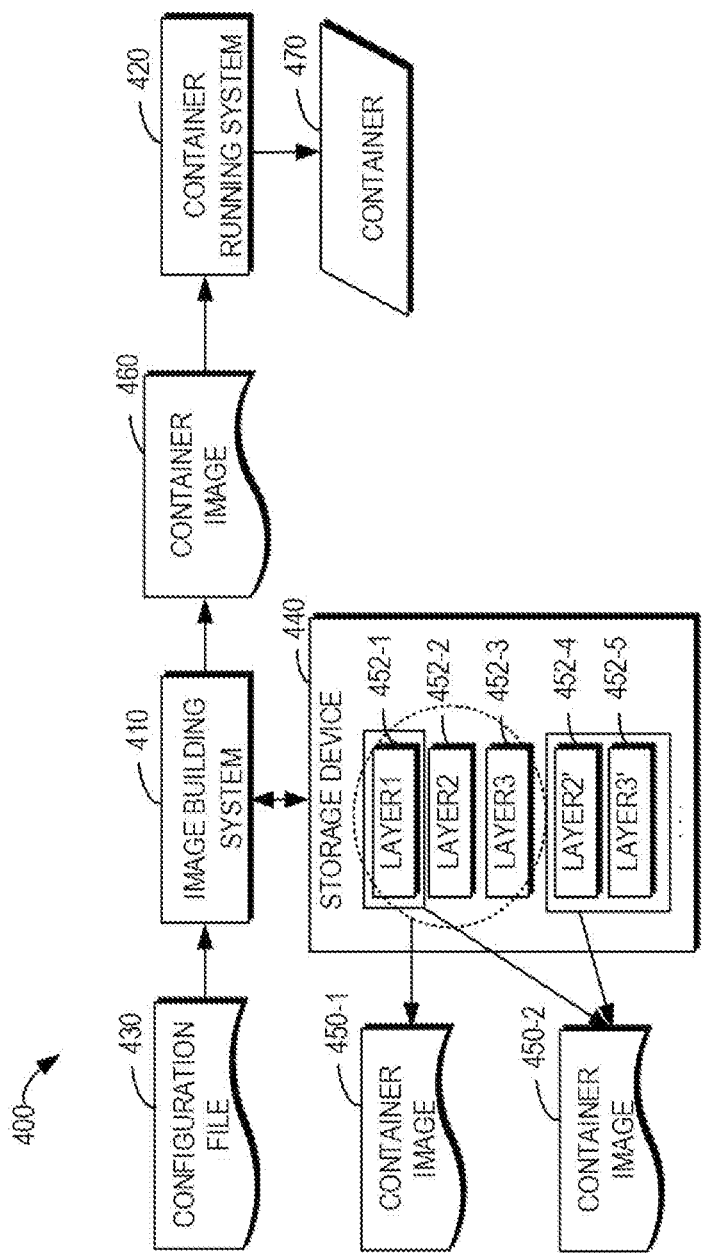
FIG. 4 depicts a block diagram of a container-based environment according to some embodiments of the present invention.

Various example embodiments of the present invention are related to a container-based environment. FIG. 4 shows a container-based environment 400 according to some embodiments of the present invention.

As illustrated in FIG. 4, the environment 400 may generally include an image building system 410 for building a container image and a container running system 420 for providing a container. In one or more embodiments, the image building system 410 and/or the container running system 420 may be implemented by a computer system, such as the computer system/server 12 discussed above with reference to FIG. 1.

During an image building process, the image building system 410 is configured to generate a container image 460 based on a configuration file 430 and one or more container images 450-1, 450-2 that have been already built (collectively or individually referred to as container images 450). As used herein, the configuration file may be a text-based file or script that contains a sequence of commands for generating a container image. In Docker environment, the configuration file may include Dockerfile. As mentioned above, a container image may include a sequence of layers. The layers of the container image are built in order according to the sequence of commands in the configuration file, where each layer is generated based on one command.

The request to build a new container image based on the configuration file 430 may be caused by various events, such as value changes to parameters in commands, tool package updates, file changes, and so on. Those events generally will not result in changing of the commands in the configuration file 430, but will trigger building of a new container image.

Examples of commands that can be included in Dockerfile includes "FROM," "MAINTAINER," "RUN," "MAKE," "COPY," "ADD," "CMD," and so on. The "FROM" command indicates a base container image from which a new container image is built. The "MAINTAINER" command indicates a maintainer of the container image and possibly contact information of the maintainer. The "RUN" command indicates custom instructions running in building the container image and can build a custom application using the "MAKE" command. The "COPY" command adds some files from a local directory. The "ADD" command specifies one or more files or directories to be copied from a file source (such as a file system). The "CMD" command specifies a command set to run within the container.

In some embodiments, layers of the container image 450-1, 450-2 built from the same configuration file 430 may be stored (cached) in a storage device 440, allowing faster building of subsequent container images. For example, when building a new container image, if files to be processed by a command in the configuration file 430 remain unchanged, a layer that has been generated for a previous container image based on the same command may be reused, for example, by making a reference to the previously-generated layer in the new container image. As compared with creating a new layer which requires creating and writing a new file structure, the reuse of the previously generated layer can facilitate fast building and save processing resources of the image building system 410.

As shown in FIG. 4, the container image 450-1 may consist of a sequence of layer 452-1, layer 452-2, and layer 452-3 which are stored in the storage device 440. The container image 450-2 may consist of a sequence of layer 452-1, layer 452-4, and layer 452-5, where layer 452-1 is reused with the container image 450-1 that was built previously. All the layers 452-1 to 452-5 of the container images 450-1, 450-2 can also be reused to build the container image 460. After completion of building of the container image 460, one or more new layers of the container image 460 may be stored into the storage device 440. Information on the structure of the container images 450 and 460 may also be stored in the storage device 440.

During the container running phase, the container running system 420 may be configured to read the container image 460 to run a container 470.

It is to be understood that the structure and functionality of environment 400 are described only for the purpose of illustration without suggesting any limitations as to the scope of the present disclosure. The embodiments of the present disclosure can be embodied, in one or more other implementations, with different structure and/or functionality. In the following discussion, various embodiments of the present disclosure are discussed and principally illustrated in conjunction with Docker as an example of a container-based environment. It is to be understood that this is only for the purpose of illustration, without suggesting any limitations to the scope of the present disclosure. Examples of other containerization technologies exist in the art.

As discussed above, the reuse of the layers of the previously built container images have various benefits. Generally, as layers of a container images are generated based on commands in the configuration file in sequence, the organization of the commands in the configuration file is important. A condition of reusing of a layer is that files to be processed by the corresponding command in the configuration file are unchanged. If one or more files which are to be processed (for example, added or copied) by a command changes (while the command is not changed), it is not allowed to reuse a stored layer of a previously built container image that is generated based on the command; thus, a cache miss is found. In this case, a new layer is to be built based on the command in order to reflect the file change. If there is one or more layers following the cache-miss layer in the previously built container images, those following layers also cannot be re-used even if the files to be processed by following commands are not changed.

The inventors have found that if commands in the configuration file can be reorganized in a better way, the cache miss problem can be alleviated and more layers of the previously built container images can be reused to enable fast building of subsequent container images. However, well reorganization of the configuration file requires expertise experience. Traditionally, many users define commands of configuration files in arbitrary sequence without fully considering whether the dependency between commands will result in cache miss of layers. Currently, there is no existing approach to easily refine a configuration file.

According to various example embodiments of the present invention, there is provided a solution for determining an update for a configuration file used in building container images. Specifically, two or more container images that have been built based on a same configuration file are obtained to determine file dependency among a sequence of commands comprised in the configuration file. The file dependency is determined by comparing files associated with layers in the built container images. For example, files associated with layers at a same level in the container images are compared to determine if one or more file changes occur at this level. Then the file dependency is used to determine an update to the sequence of commands in the configuration file. The sequence of commands may be modified automatically based on the determined update or the update may be presented as a recommendation to a user to modify the configuration file.

According to this solution, an intelligent and efficient way is provided to refine the configuration file by analyzing file dependency between commands in the configuration file. As such, the refined configuration file may facilitate fast building of container images in subsequent image building processes by enabling more layers of the built container images to be reused.

Other advantages of embodiments of the present invention will be described with reference to the example implementations below.

Figure 5:
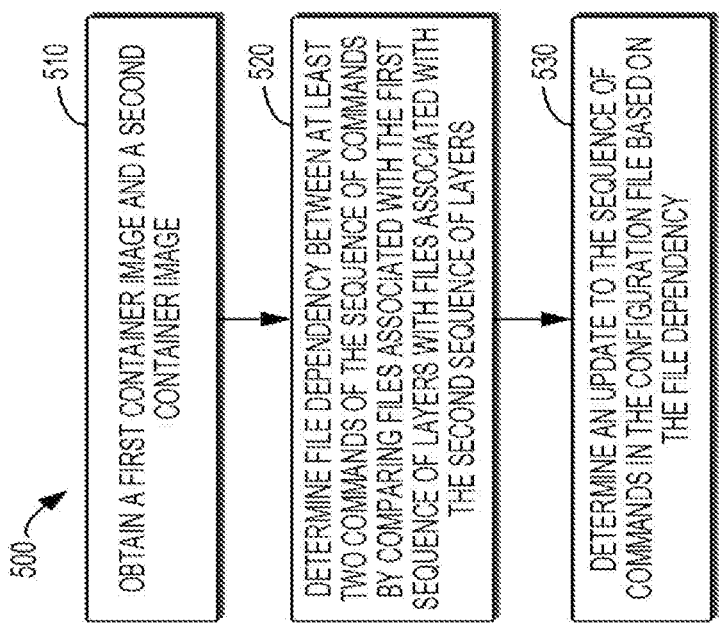
FIG. 5 depicts a flowchart of a process for determining an update for a configuration file according to some embodiments of the present invention.

Reference is now made to FIG. 5, which illustrates a flowchart of an example process 500 according to some embodiments of the present invention. The process 500 can be implemented by any computer system, such as the computer system/server 12 discussed above with reference to FIG. 1, to determine an update to a configuration file (such as the configuration file 430 in FIG. 4) used in building a container image. For the purpose of discussion, the process 500 will be described with reference to FIG. 1 and some embodiments of the process 500 will be described with reference to FIG. 4.

At block 510, the computer system/server 12 obtains a first container image comprising a first sequence of layers and a second container image comprising a second sequence of layers. The first and second container images are images that have been built based on a same configuration file. For convenience of discussion, the first and second container images may refer to the container images 450-1, 450-2 in the example of FIG. 4, respectively, which are built based on the configuration file 430.

Figure 6:
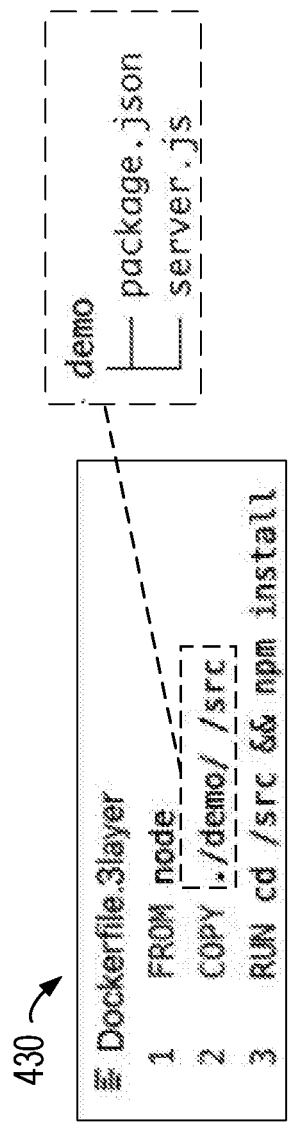
FIG. 6 depicts an example of a configuration file according to some embodiments of the present invention.

As mentioned above, the configuration file 430 comprises a sequence of commands FIG. 6 illustrates an example of the configuration file 430. In this example, the configuration file 430 comprises three commands in sequence, including "FROM" command, "COPY" command, and "RUN" command. It is to be understood that the example in FIG. 6 is merely provided for purpose of illustration only, without suggesting any limitation to the present disclosure.

Each of the first sequence of layers in the container image 450-1 and each of the second sequence of layers in the container image 450-2 are generated based on one command in the configuration file 430. The layers of the first and second container images generated based on a same command may be considered as at a same level. In some embodiments, one of the first and second container images 450-1, 450-2 may be a base container image, which might be the first image built based on the configuration file 430.

At block 520, the computer system/server 12 determines file dependency between at least two commands of the sequence of commands by comparing files associated with the first sequence of layers with files associated with the second sequence of layers.

One or more commands of the sequence of commands in the configuration file 430 may be configured to process one or more files. Examples of the commands in the configuration file 430 that process files include, but are not limited to, the "ADD" command which specifies one or more files or directories to be copied from a file source (such as a file system) and the "COPY" command which adds some files from a local directory. There may be other commands used in Docker or other container-based environments and related to processing of one or more files. A layer generated based on such command may be associated with the file(s). Thus, building a new layer according to such command may require various operations to be performed with respect to the files, including one or more of downloading, input/output (I/O) operation, transmitting, parsing, decoding, compressing/decompressing, and so on.

The file dependency between at least two commands of the sequence of commands includes file dependency between every two sequential commands in the sequence. As used herein, file dependency between two sequential commands indicates whether one or more changes in one or more files to be processed by one command leads to one or more changes in one or more files to be processed by the other command. If a change in a specific file to be processed by one command does not lead to a change in files for the following command(s), the following command(s) does not depend on the one command with respect to that specific file. If a large amount of file changes occur in one or more following commands when a specific file to be processed in one command changes, the following command highly depend on the one command with respect to that specific file.

In some embodiments, the file dependency may further indicate a degree of dependency between the two or more commands. Alternatively, or in addition, the file dependency may further indicate the one or more specific files with respect to which the file dependency is determined, i.e., the file(s) whose changes will or will not lead to one or more changes in the files to be processed by the following command(s).

According to example embodiments of the present invention, the file dependency is determined by analyzing changes in files associated with respective layers of the existing first and second container images 450-1, 450-2. To analyze the files, information on respective layers of the first and second container images 450-1, 450-2 are obtained. Such information may be stored, for example, in the storage device 440.

FIG. 7 shows some examples of information on the first and second container images 450-1, 450-2 as well as information on the configuration file 430. An example table 730 in FIG. 7 lists command lines and corresponding variables in respective commands in the configuration file 430. An example table 750-1 lists information on respective layers in the first container image 450-1, including the layer numbers, layer identities (IDs), and details on the creation of the layers. The layers in the first container image 450-1 are corresponding to the sequence of commands in the configuration files, respectively. Similarly, an example table 750-2 shows information on respective layers in the second container image 450-2.

The files associated with the layers of the first and second container images 450-1, 450-2 may be determined based on the obtained information 750-1, 750-2. In some embodiments, to determine the file dependency, files associated with a pair of corresponding layers at a same level in the first and second container images 450-1, 450-2 are compared to determine whether one or more file change occur at the corresponding layers. For example, files associated with Layer2 in the first container image 450-1 are compared with files associated with Layer2 in the second container image 450-2.

In some embodiments, the comparison of files may start from such a level that a first layer at this level in the first container image 450-1 is found to be different from a corresponding second layer at the same level in the second container image 450-2. In some cases, one of the first and second container images 450-1, 450-2 may be first built while the other one may be built in a sequence time point. As such, some of the layers in the previously built container image may be reused in building a subsequent container image; while the other layers in the subsequent container image may be directly built based on the commands as new layers. Such a new layer may be considered as a cache-miss layer as no cached layer is found. As for the first and second layers determined from the first and second container images 450-1, 450-2, if the first layer is built before the second layer, the second layer in the second container image 450-2 may be a cache-miss layer.

The computer system/server 12 may determine the first and second layers from the first and second container images 450-1, 450-2 respectively based on their layer identities (as shown in the tables 750-1, 750-2). For example, layer IDs at a same level (corresponding to the same command) in the first and second container images 450-1, 450-2 are compared. The comparison may start from layer IDs at the first level (corresponding to the first command in the configuration file). If the first pair of layer IDs are determined to be different, the layers identified by the layer IDs are determined to be the first layer in the first container image 450-1 and the second layer in the container image 450-2. In the example of FIG. 7, Layer2 in the first container image 450-1 is found to be different from Layer2 in the second container image 450-2 as their layer IDs ("c22e63230f3c" and "cc7658e515c4") are different.

According to the image building mechanism, if the first and second layers at the same level in the first and second container images 450-1, 450-2 are found to be different, a layer(s) following the first layer and a layer(s) following the second layer are also different (for example, being cache miss). As can be seen from the example of FIG. 7, Layer3 in the first container image 450-1 and Layer3 in the second image 450-2 are different (as they are identified with different layer IDs). On the other hand, a layer(s) preceding the first layer and a layer(s) preceding the second layer at the same level(s) will be the same. In the example of FIG. 7, Layer1 in the first container image 450-1 and Layer2 in the second container image 450-2 are the same (as they are identified with a same layer ID). Generally, one copy of such same layers is stored, for example, in the storage device 440.

As mentioned above, the comparison of files starts from the first and second layers (for example, Layer2 in the first container image 450-1 and Layer2 in the second container image 450-2). As such, a first set of files associated with the first layer and at least one layer following the first layer in the first container image 450-1 may be compared with a second set of files associated with the second layer and at least one layer following the second layer in the second container image 450-2. Particularly, files associated with a layer are compared with files associated with another layer at the same level. In such embodiments, the file dependency determined based on such comparison may indicate file dependency between the commands for building the first and second layers and at least one command following that command.

The comparison of the first and second sets of files is to find whether there are one or more file changes at each level of the layers. A file change may include addition of a file at the level, deletion of a file at this level, or change of content contained in a file at this level. For example, if it is found that a file associated with the first layer in the first container image 450-1 is not included in the second layer in the second container image 450-2 or vice versa, a file change is determined.

In some embodiments, to facilitate the comparison of the first and second sets of files, file information related to the respective files may be obtained and compared to determine one or more file changes at each level of the layers. The file information may include file names, file attributes, file directory structures, and/or information on corresponding levels of layers that are related to the respective files. A file attribute may indicate whether a file is newly added or deleted. The file names, file directory structures, and information on the levels of layers may be used to localize the files at the same location in the whole file directories of the layers at the same level.

In some embodiments, if two files associated with layers at a same level in the first and second container images 450-1, 450-2 have a same file name and included at corresponding positions in file directories, it is possible that contents in the two files may be different. In order to determine whether the two files are different from each other, hash values of contents comprised in the first and second files are calculated. Various suitable algorithms for calculating a hash value may be employed here, an example of which is the MD5 algorithm. The hash value of content of a file may sometimes be called a file checksum. In some embodiments, if the hash values are different from each other, it means that the two files are not the same in content and thus a file change is detected at the current level.

Figure 8:
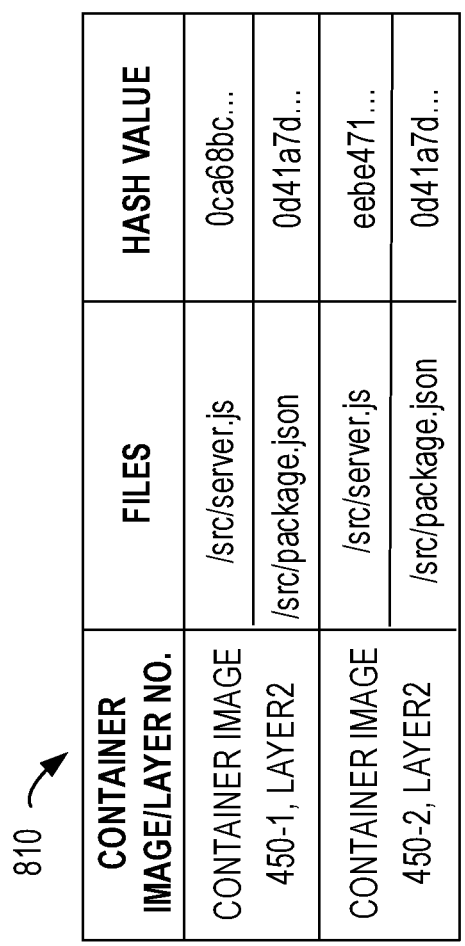
FIG. 8 depicts an example showing hash values of files having the same file names according to some embodiments of the present invention.

FIG. 8 is an example table 810 showing hash values of files having the same file names Layer2 in the first container image 450-1 and Layer2 in the second container image 450-2 are both associated with two files having respective same file names "server.js" and "package.json" under a same root directory "src," represented as "/src/server.js" and "/src/package.json" in FIG. 8. By referring back to FIG. 6, it can be seen that the command "COPY" at line 2 of the configuration file 430 is configured to process the two files named "server.js" and "package.json."

In order to determine whether there is a change in the corresponding files associated with the two layers, the computer system/server 12 may determine hash values of contents of the files, as shown in FIG. 8 and compare the determined hash values. For example, the hash values for the files with the same file name "server.js" are compared, and the hash values for the files with the same file name "package.json" are compared. It is determined that the hash values for the files with the file name "server.js" are different while the hash values for the file name "package.json" are the same. For following Layer3 in the first and second container images 450-1, 450-2, similar method may be applied to determine whether there is a change in the associated files.

After the files associated with the layers at respective same levels are compared, the computer system/server 12 may determine an amount of changes in files associated with layers at each level based on the result of the comparison. The amount of changes in files (or file changes) is determined per level. In some example, only layers starting from the first and second layers with cache miss are considered, as discussed above. Depending on the amount of changes in files, the file dependency between at least two commands of the sequence of commands may be determined.

Specifically, if no change in files is determined for a level following the level of the first and second layers with cache miss, it means that a change in a specific file to be processed by one command for generating the first and second files does not lead to a change in files to be processed by the following command. Then the file dependency is determined to indicate that the two commands do not depend on each other with respect to the specific file.

If a certain amount of changes in files are determined for a level following the level of the first and second layers, it means that a change in a file to be processed by one command for generating the first and second files leads to a change in files to be processed by the following command. Then the file dependency may be determined to indicate the dependency between the two commands in the file. For example, a degree of dependency between the two commands may be calculated based on a division of the amount of changes in files determined for the following level by the amount of changes in files determined for the current level of the first and second layers.

Figure 9:
FIG. 9 depicts an example showing information on the file dependency between at least two commands in a configuration file according to some embodiments of the present invention.

FIG. 9 illustrates an example table 910 which shows information on the file dependency between at least two commands of the sequence of commands in the configuration file 430. By comparing the files associated with the layers in the first and second container images 450-1, 450-2, as discussed with reference to FIG. 8, the computer system/server 12 detects a change in the file "server.js" to be processed by the command "COPY" at line 2 of the configuration file 430.

The table 910 records the file, the starting layer with cache miss (i.e., Layer2), and the amount of file changes at each level in the second column. For the level associated with Layer2 (corresponding to the command "COPY"), one file change is identified (i.e., the change in the file "server.js"). For the following level associated with following Layer 3

(corresponding to the command "RUN"), no file change is identified. Thus, the computer system/server 12 may determine that files at the level of Layer 3 do not depend on the file "server.js" and the command "COPY" in the configuration file 430 does not depend on the following command "RUN" with respect to the file "server.js."

In some embodiments, there may be one or more additional container images built from the same configuration file 430, in addition to the first and second container images 450-1, 450-2. All the additional container images may also be used to provide more information to determine the file dependency. The file dependency may be modified or complemented as more container images have been built from the configuration file 430.

It is assumed that a third container image (such as the container image 460 in the example of FIG. 4) is generated and can be obtained to determine the file dependency. The third container image comprises a third sequence of layers, each being generated based on one of the sequence of commands in the configuration file 430. Files associated with the third sequence of layers may be compared with files associated with either the first sequence of layers in the first container image 450-1 or the second sequence of layers in the second container image 450-2. The comparison of the files may be performed in a similar way as discussed above for the comparison of files associated with the first and second sequence of layers.

In some examples where the first container image 450-1 is the base container image for the configuration file 430, the files associated with the third sequence of layers may be compared with the files associated with the first sequence of layers. That is, the base container image may be used as a reference container image for file comparison.

The computer system/server 12 may determine the file dependency further based on a result of the comparison of the files associated with the third sequence of layers and the first sequence of layers. FIG. 9 further shows an example of the file dependency determined based on the third container image, such as the container image 460 in FIG. 4. The table 910 records in the third column the file, the starting layer with cache miss (i.e., Layer2), and the amount of file changes at each level determined from the result of the comparison. For the level associated with Layer2 (i.e., corresponding to the command "COPY"), one file change is identified (i.e., the change in the file "packages.json"). For the following level associated with following Layer 3 (corresponding to the command "RUN"), 32 file changes are identified. Thus, the computer system/server 12 may determine that files at the level corresponding to Layer 3 highly depend on the file "package.json" in Layer 2.

Accordingly, the file dependency may be determined to indicate that the command "COPY" in the configuration file 430 depends on the following command "RUN" with respect to the file "package.json." A degree of such dependency may be determined, for example, by dividing 32 by 1 to obtain a relatively large number "32," which indicates a high degree of dependency between the two commands.

In some embodiments above, examples showing file dependency of two sequential commands in the configuration file 430 have been discussed. In the example of FIGS. 6-9, if more than one command follows the command "COPY," the file dependency may be determined between the command "COPY" and all the following commands. It would be appreciated that the file dependency may be determined for any of two or three sequential commands In some embodiments, more container images may be needed in order to fully or accurately determine file dependency between every two sequential commands in the configuration file 430.

Referring back to FIG. 5, after the file dependency is determined, at block 530, the computer system/server 12 determines an update to the sequence of commands in the configuration file based on the file dependency. The update to the sequence of commands may include re-ordering of the sequence of commands, for example, replacing one or more of the commands. Alternatively, or in addition, the update to the sequence of commands may include dividing a command into a plurality of commands, where the plurality of commands are configured to process respective subsets of a set of files associated with the divided command In some examples, the dividing of the command is first performed and then the resulting commands and other commands in the configuration file 430 may be further re-ordered.

By analyzing the file dependency, various updates to the sequence of commands can be provided. In some embodiments, if the file dependency indicates that one or more following commands in the configuration file 430 are independent from (have no file dependency on) a preceding command with respect to a certain file, which means that a change of the certain file in the preceding command results in no file change in the one or more following commands, then a command related to that file can be removed to be placed after the one or more following commands In some embodiments, if the file dependency indicates that one or more following commands in the configuration file 430 are highly depend on a preceding command with respect to a certain file, then a command related to this file cannot be moved after the one or more following commands due to the high degree of dependency. It would be appreciated that other updates to the configuration file may be determined as needed based on the file dependency.

The computer system/server 12 may directly modify the sequence of commands in the configuration file 430 based on the determined update. As an alternative, the determined update may be provided as a recommendation to the user. The update may be adjusted by the user as needed or may be applied to the configuration file 430 after the user's confirmation.

Figure 10:
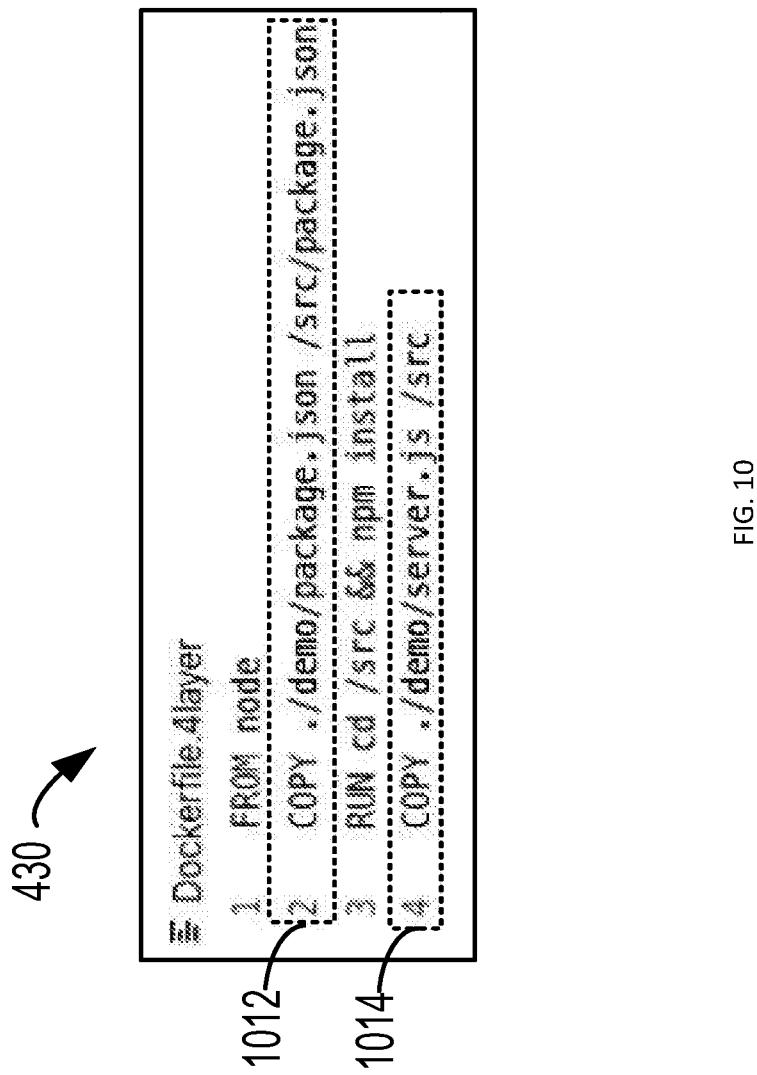
FIG. 10 depicts an example of the updated configuration file according to some embodiments of the present invention.

In the specific example of the configuration file 430 shown in FIG. 6, according to the file dependency as indicated in FIG. 9, the command "RUN" does not depend on the command "COPY" with respect to the file "server.js," but is highly depend on the command "COPY" with respect to the file "package.json." Thus, the computer system/server 12 may determine an update to the configuration file 430 to split the command "COPY" into two commands "COPY," each configured to process one of the files "server.js" and "package.json." The command "COPY" configured to process the file "server.js" may be removed after the command "RUN" and the command "COPY" configured to process the file "package.json" may not be removed after the command "RUN." FIG. 10 shows an example of the updated configuration file 430 where two commands "COPY" 1012 and 1014 are generated from the previous command "COPY," one placed before the command "RUN" as the previous command "COPY" and the other one removed after the command "RUN."

As such, by use of the updated configuration file 430, if the file "server.js" is changed (the content updated or the file is deleted) in building a new container image, no cache miss is found for the layers that have been built based on the command "FROM," the first command "COPY," and the command "RUN." Those built layers can be reused in building the new container image in a faster manner Such fast building can save the time cost, processing resource, and networking resources.

In some embodiments, the file dependency can be updated as more container images are obtained for analysis and accordingly, the configuration file 430 may be further updated in order to further improve the efficiency in image building.

It should be noted that the processing of determining an update for a configuration file according to embodiments of this disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, a first container image and a second container image, each container image comprising a sequence of layers built based on a sequence of commands in a configuration file;
comparing a layer identifier of a first layer of the first container image to a layer identifier of a first layer of the second container image;
determining that a file dependency exists based on the comparing not being equal, wherein the determining further comprises:
identifying a first layer from the first sequence of layers and a second layer from the second sequence of layers, the first and second layers being at a same level in the first and second sequences and built based on a same command in the sequence of commands, and the first and second layers being different from each other;
comparing a first set of files associated with the first layer and at least one layer following the first layer in the first sequence of layers with a second set of files associated with the second layer and at least one layer following the second layer in the second sequence of layers; and
determining, based on a result of a comparison, the file dependency between the command for building the first and second layers and at least one command following the command in the sequence of commands;
in response to the layer identifiers being equal, determining whether contents of a file that is an object of a command that built the first layer of the first container image is equal to contents of a file that is an object of the command that build the first layer of the second container image;
based on the file contents being equal, determining that no dependency exists between the file that is the object of the command and a file that is an object of the command that built a next layer in the second container image;
in response to the contents not being equal, determining an amount of difference between the two files, wherein the amount of difference is a degree of dependency; and
determining, by the one or more processors, an update to the sequence of commands in the configuration file based on the file dependency.

2. The method of claim 1, wherein comparing the first and second sets of files comprises:
obtaining, by the one or more processors, file information related to the first and second sets of files, the information comprising at least one of the following: file names, file attributes, file directory structures, and information on corresponding levels of layers; and
determining, by the one or more processors, at least one file change in the first and second sets of files by comparing the obtained file information related to the first and second sets of files.

3. The method of claim 2, wherein the file information related to the first and second sets of files further comprises: hash values of contents comprised in a first file of the first sets of files and in a second file of the second set of files, the first and second files having a same file name and being included at corresponding positions in file directories.

4. The method of claim 2, wherein determining the file dependency based on the result of a comparison comprises:
for each pair of layers at a same level among the first and second layers and the layers following the first and second layers, determining, by one or more processors, a respective amount of file changes in the first and second sets of files associated with the pair of layers based on the result of the comparison; and
determining, by one or more processors, the file dependency based on the respective amount of changes determined for each pair of layers at the same level.

5. The method of claim 1, wherein the update comprises at least one of the following:
re-ordering of the sequence of commands, and
dividing one of the sequence of commands into a plurality of commands, the plurality of commands being configured to process respective subsets of a set of files associated with the divided command.

6. The method of claim 1, further comprising:
obtaining, by the one or more processors, a third container image comprising a third sequence of layers, the third container image built from the configuration file; and
wherein the determining the file dependency further comprises:
determining, by the one or more processors, the file dependency by comparing files associated with the third sequence of layers with the files associated with the first or second sequence of layers.

7. The method of claim 1, wherein at least one of the first and second container images comprises a base container image.

8. A system comprising:
a processing unit; and
a memory coupled to the processing unit and storing instructions thereon, the instructions, when executed by the processing unit, performing acts comprising:
obtaining, by one or more processors, a first container image and a second container image, each container image comprising a sequence of layers built based on a sequence of commands in a same configuration file
comparing a layer identifier of a first layer of the first container image to a layer identifier of a first layer of the second container image;
determining that a file dependency exists based on the comparing not being equal, wherein the determining further comprises:
identifying a first layer from the first sequence of layers and a second layer from the second sequence of layers, the first and second layers being at a same level in the first and second sequences and built based on a same command in the sequence of commands, and the first and second layers being different from each other;
comparing a first set of files associated with the first layer and at least one layer following the first layer in the first sequence of layers with a second set of files associated with the second layer and at least one layer following the second layer in the second sequence of layers; and determining, based on a result of a comparison, the file dependency between the command for building the first and second layers and at least one command following the command in the sequence of commands;

in response to the layer identifiers being equal, determining whether contents of a file that is an object of a command that built the first layer of the first container image is equal to contents of a file that is an object of the command that build the first layer of the second container image;

based on the file contents being equal, determining that no dependency exists between the file that is the object of the command and a file that is an object of the command that built a next layer in the second container image;

in response to the contents not being equal, determining an amount of difference between the two files, wherein the amount of difference is a degree of dependency; and determining, by the one or more processors, an update to the sequence of commands in the configuration file based on the file dependency.

9. The system of claim 8, wherein comparing the first and second sets of files comprises:

obtaining file information related to the first and second sets of files, the information comprising at least one of the following: file names, file attributes, file directory structures, and information on corresponding levels of layers; and determining at least one file change in the first and second sets of files by comparing the obtained file information related to the first and second sets of files.

10. The system of claim 9, wherein the file information related to the first and second sets of files further comprises: hash values of contents comprised in a first file of the first sets of files and in a second file of the second set of files, the first and second files having a same file name and being included at corresponding positions in file directories.

11. The system of claim 9, wherein determining the file dependency based on the result of the comparison comprises:

for each pair of layers at a same level among the first and second layers and the layers following the first and second layers, determining a respective amount of file changes in the first and second sets of files associated with the pair of layers based on the result of a comparison; and determining the file dependency based on the respective amount of changes determined for each pair of layers at the same level.

12. The system of claim 8, wherein the update comprises at least one of the following:

re-ordering of the sequence of commands, and dividing one of the sequence of commands into a plurality of commands, the plurality of commands being configured to process respective subsets of a set of files associated with the divided command.

13. The system of claim 8, the acts further comprising:

obtaining a third container image comprising a third sequence of layers, the third container image built from the configuration file; and wherein the determining the file dependency further comprises:

determining the file dependency by comparing files associated with the third sequence of layers with the files associated with the first or second sequence of layers.

14. The system of claim 8, wherein at least one of the first and second container images comprises a base container image.

15. A computer program product, the computer program product comprising a computer readable storage medium having program instructions embodied therewith, the program instructions executable by an electronic device to cause the electronic device to perform acts comprising:

obtaining, by one or more processors, a first container image and a second container image, each container image comprising a sequence of layers built based on a sequence of commands in a same configuration file;

comparing a layer identifier of a first layer of the first container image to a layer identifier of a first layer of the second container image;

determining that a file dependency exists based on the comparing not being equal, wherein the determining further comprises:

identifying a first layer from the first sequence of layers and a second layer from the second sequence of layers, the first and second layers being at a same level in the first and second sequences and built based on a same command in the sequence of commands, and the first and second layers being different from each other;

comparing a first set of files associated with the first layer and at least one layer following the first layer in the first sequence of layers with a second set of files associated with the second layer and at least one layer following the second layer in the second sequence of layers; and determining, based on a result of a comparison, the file dependency between the command for building the first and second layers and at least one command following the command in the sequence of commands;

in response to the layer identifiers being equal, determining whether contents of a file that is an object of a command that built the first layer of the first container image is equal to contents of a file that is an object of the command that build the first layer of the second container image;

based on the file contents being equal, determining that no dependency exists between the file that is the object of the command and a file that is an object of the command that built a next_layer in the second container image;

in response to the contents not being equal, determining an amount of difference between the two files, wherein the amount of difference is a degree of dependency; and determining, by the one or more processors, an update to the sequence of commands in the configuration file based on the file dependency.

16. The computer program product of claim 15, wherein comparing the first and second sets of files comprises:

obtaining file information related to the first and second sets of files, the information comprising at least one of the following: file names, file attributes, file directory structures, and information on corresponding levels of layers; and determining at least one file change in the first and second sets of files by comparing the obtained file information related to the first and second sets of files.

17. The computer program product of claim 15, wherein the update comprises at least one of the following:

re-ordering of the sequence of commands, and dividing one of the sequence of commands into a plurality of commands, the plurality of commands being configured to process respective subsets of a set of files associated with the divided command.

* * * * *